Jan. 2, 1934.  R. G. MILLER  1,942,391
AIRPLANE WING SPAR
Filed April 26, 1932  2 Sheets-Sheet 1
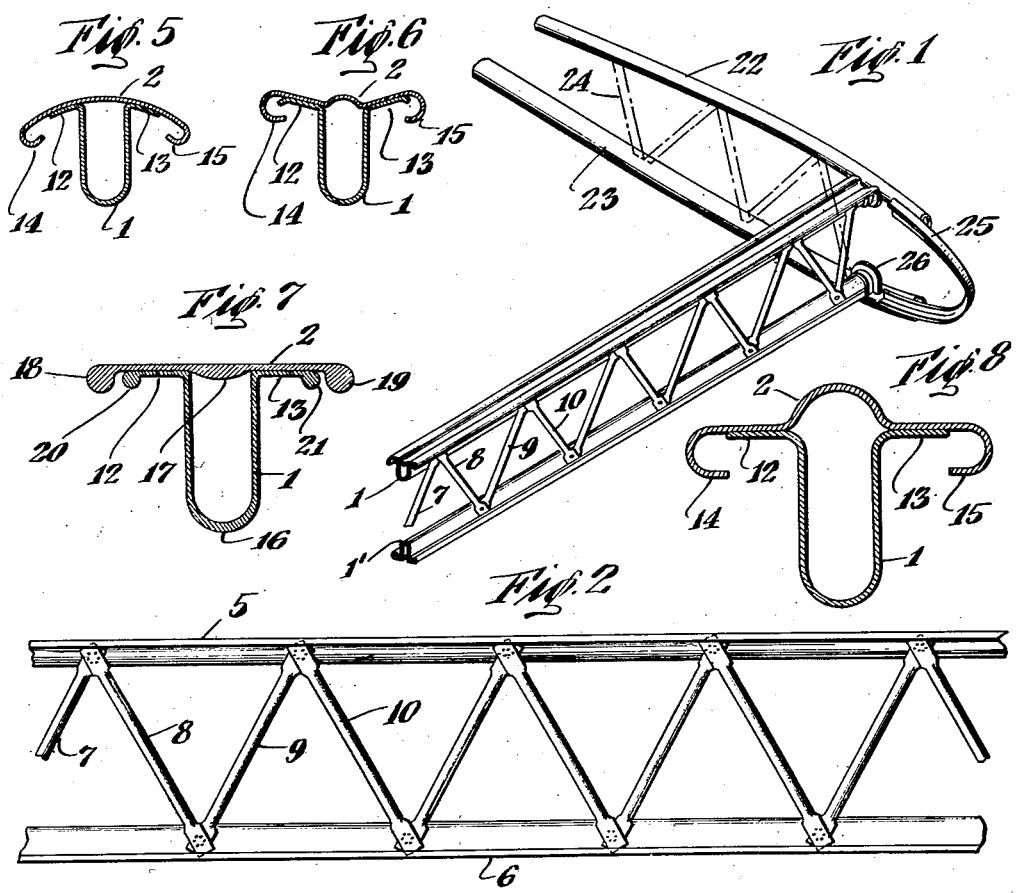
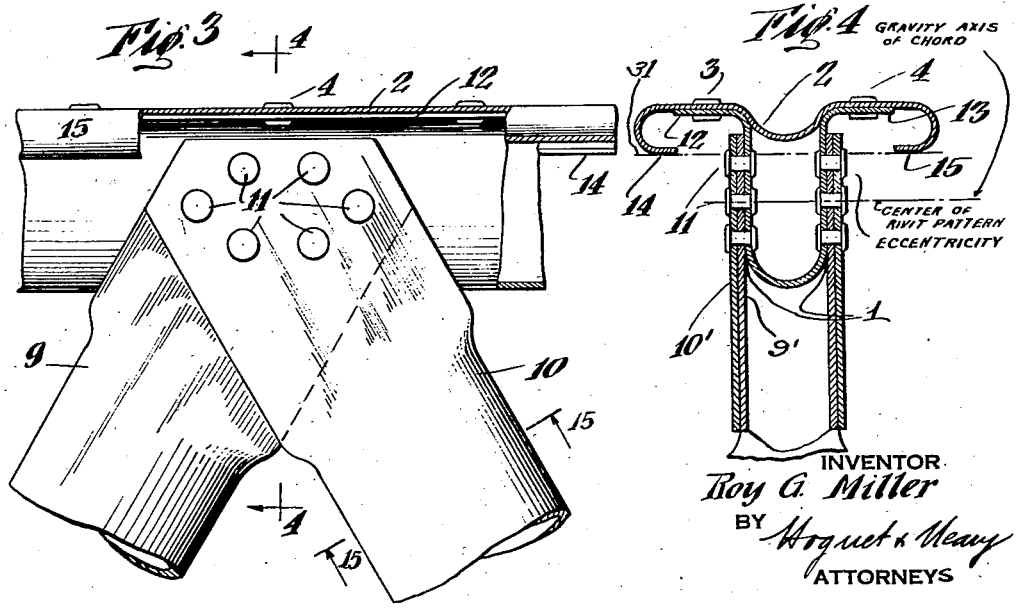
INVENTOR
Roy G. Miller
BY
ATTORNEYS

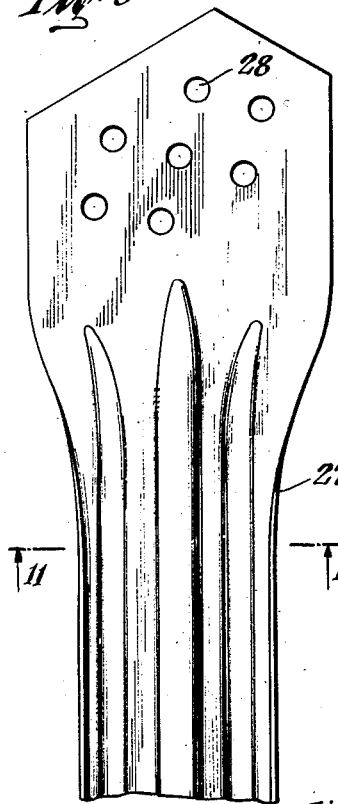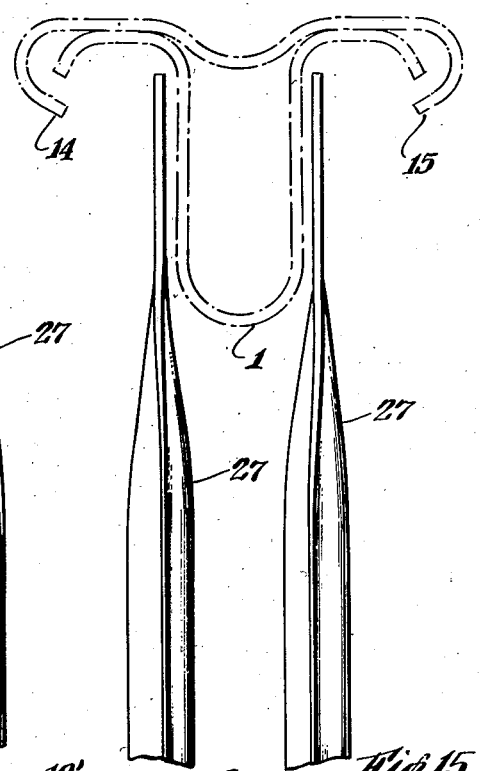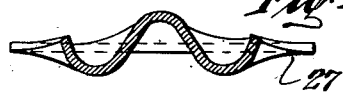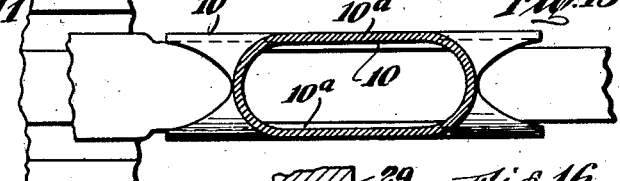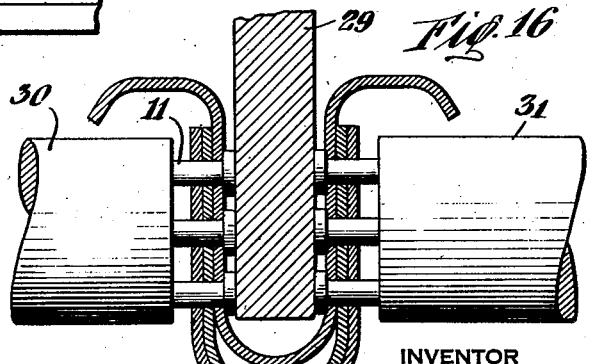

Patented Jan. 2, 1934

1,942,391

UNITED STATES PATENT OFFICE 1,942,391

AIRPLANE WING SPAR

Roy G. Miller, Farmingdale, N. Y., assignor to Curtiss Aeroplane & Motor Company, Inc., Buffalo, N. Y., a corporation of New York Application April 26, 1932. Serial No. 607,545

5 Claims. (Cl. 244—31)

This invention relates in general to airplane construction and more particularly to a construction of airplane wing spars.

The object of the invention is to provide an airplane wing which may be easily assembled to the end that it will be properly braced when assembled.

Another object is to provide an inherently braced wing spar so that the truss construction may be assembled without the use of separate gussets.

Another object is to provide a truss assembly of hollow chord members which may be braced by tubular diagonals and that the necessary connections may be made by single rivet patterns, which rivets may be applied by the use of ordinary squeeze tools.

Another object is to provide such a construction in respect to the truss members that the terminal strength and the joint fixity to the chord members will be improved.

Another object is to provide such a construction that will minimize the tendency of failure by twisting or locally crinkling.

Another object is to provide such a construction that will so eliminate the conventional multiplicity of parts as to considerably reduce the weight of the wing construction.

Another object is to provide such a wing construction wherein the intersection of the wing spar members and the wing spar will be such as to equalize the stress distribution induced in the chord members through beam action.

With the foregoing and other objects in view, the invention consists in the details of construction and the combination of parts hereinafter set forth in the following specification and appended claims, certain embodiments thereof being illustrated in the accompanying drawings, in which:

Figure 1 is a view in perspective of the wing spar showing its intersection with one of the rib members;

Figure 2 is an enlarged view in front elevation of the wing spar;

Figure 3 is a detailed view showing the manner in which the tubular diagonal truss members are connected to the frame chord member of the spar;

Figure 4 is a view in section taken along line 4—4 of Figure 3;

Figure 5 is a view similar to Figure 4 showing a modification of the form shown therein;

Figure 6 is a similar view showing another modified form;

Figure 7 is a similar view showing another modified form;

Figure 8 is a similar view showing another modified form;

Figure 9 is a view in side elevation of a modified form of tension diagonal truss member;

Figure 10 is a view in front elevation of that shown in Figure 9;

Figure 11 is a view in section taken along line 11—11 of Figure 9;

Figure 12 is a view in cross-section taken through a modified form of diagonal truss member;

Figure 13 is a view in cross-section of another modified form of diagonal truss member;

Figure 14 is a view in front elevation showing a pair of diagonal truss members, such as shown in Figures 9 and 10, and their relative position to the spar chord, which latter is shown in dotted lines;

Figure 15 is a view in section taken along line 15—15 of Figure 3;

Figure 16 is a view taken through the spar chord and the overlapping terminals of two adjacent diagonal truss members and also showing a series of rivets and the operating members of a suitable device for squeezing the rivets to effect the connection of these adjacent members.

Referring more particularly to the drawings, and especially to Figure 4, the airplane wing spar consists primarily of a U-strip 1 and a cap strip 2, which is riveted to the U-strip by rivets 3 and 4 to form the upper and lower frame chord members indicated generally at 5 and 6, respectively, in Figure 2. A series of tubular diagonal members, such as shown in Figure 2, at 7, 8, 9, 10, etc., are connected to each other and to the upper and lower frame chord members of the spar to constitute a Warren truss for the spar.

These tubular members have their ends flattened and split so as to saddle the U-strip of the spar frame chord member and one of the diagonal terminals is split so as to be wider than the terminal of the adjacent diagonal so that it may saddle the same. In this manner a single rivet pattern may be used for the connection of the two adjacent terminals to each other and the spar U-strip. This rivet pattern is shown in detail in Figures 3 and 4. I have found it preferable to enlarge the split terminal of the tension diagonals so that they will fit snugly over the terminal of the adjacent compression diagonal as the latter is fitted snugly over the U-strip and therefore this general scheme is carried throughout the entire Warren truss. For purposes of illustration, in Figure 3, the diagonal 10 may be referred to as a tension diagonal and diagonal 9 as a compression member. By references to Figures 3 and 4, it will then be seen that the split terminal 9' of the compression diagonal fits snugly about the U-strip 1 and that the split terminal 10' of the tension diagonal 10 fits snugly about the terminal 9'.

The sequence of the assembly of the construction is preferably, as follows: The tubular diagonals are arranged and held in a jig and the upper and lower U-strips 1 and 1' are then placed and riveted to the tubular diagonals after they have been placed in the particular relationship above described and illustrated in Figures 3 and 4. While held in such position a series of rivets may then be applied by the use of ordinary squeeze tools so as to securely fasten the two adjacent diagonal terminals to each other and to the U-strip. An illustration of such a rivet pattern is shown in Figures 3 and 4 but may be modified to suit any particular requirements. For purposes of identification these rivets generally are indicated at 11. The next procedure is to secure the cap strips to the U-strips so as to form the frame chord member of the spar. The U-strips are preferably formed so as to provide flanges 12 and 13 to provide for easy application of the rivets 3 and 4 for securing the cap strip thereto. The cap strip may assume various actual forms as exemplified in the modifications shown in Figures 5 to 8, inclusive. In each instance it is considered preferable to so form the cap strip that the outer edges will be rounded by such means as curving the ends downwardly and inwardly, as shown, for example, in Figure 4, at 14—15. In this connection, it may be assumed that the application of the rivets 3 and 4, as shown in Figure 4, may assume any particular pattern as strength requirements may call for.

This construction, affording as it does the use of single rivet patterns for the joining of the terminals of both diagonals to each U-strip of the spar chord member, does away with the use of separate gussets found in the conventional construction without in any way lessening the strength of the spar construction. This makes for not only simple construction but rapid assembly as will be appreciated by the above description of the sequence of assembly and also lessens the weight of the construction to a very appreciable degree by the elimination of gusset plates. The use of seamless hollow chord members also makes for lightness of construction and reliable strength requirements. The manner of assembly of the spar further makes for improved terminal strength and joint fixity to improve the strength of the chord members. It is also of importance that the use of hollow members eliminates a tendency to fail by twisting and further the use of open edges in each chord member and the fact that these edges are bent at 14 and 15 towards its gravity axis prevents local crinkling.

All of the extremes of the contour are curved in section to increase the strength of the assembly and by this statement I have reference to the curvature of the closed end of the U-strip, the curved portion of the cap strip in alignment with the curved bottom of the U-strip, and also the curvature of the upper ends of the cap strip. As shown in Figures 5 to 8, inclusive, several alternate shapes of chord members may be used to fit certain aerofoils and to employ extruded shapes. In each instance, however, such as in Figures 5, 6 and 8, the same principle is employed as regards the construction of the extremes of the contour, so that it is curved in section to increase the strength and by this I have reference to the fact that the bottom of the U-strip is curved and the portion of the cap strip in alignment therewith and the ends of the cap strip are both also accordingly curved. A slightly modified form is shown in Figure 7, in which the bottom portion of the U-strip may be not only curved but enlarged in wall thickness at 16, the cap strip 2 instead of being curved may be its wall thickness, enlarged at 17 in alignment with the bottom of the U-strip and the extremities of the cap strips 18 and 19 and the extremities of the U-strip flanges 20 and 21 may all have their wall thickness enlarged.

As shown in Figure 1, the intersection of the web members is preferably excentric to the gravity axis of the chord as indicated at 32 so as to have a tendency to equalize the stress distribution induced in the chord members through beam action. The wing rib may comprise upper and lower chord members 22 and 23 with suitable diagonal truss members 24. The nose plate of the wing is indicated at 25. The wing ribs may be each provided with curved brackets, such as 26, so as to releasably engage and hold in place the frame chord members of the wing spar. This figure, while not drawn to an exact scale generally represents the relationship of the point of intersection of the spar with the rib and the nose strip, so as to indicate generally the excentric of the point of intersection with relation to the curved axis of the chord.

While I have illustrated and described all of the diagonals of the Warren truss for the wing spar as tubular members, I may employ members of different construction. However, in reference to any change from the construction shown and described, I would preferably limit such change so that the compression members would remain as shown and described and arrange the tension diagonals so that they would be of open section, in order to possibly facilitate assembly. In carrying out this change Figures 9 and 10 show two arbitrary sections which I may employ.

Thus the tension diagonal 27 is formed so that its cross-section will have several convolutions as a strengthening expedient, as shown in Figures 9 and 11. Figures 12 and 13 merely show other cross-sections which may be employed in place of that shown in Figure 11. The truss member 27 is provided with a series of apertures 28 arranged in any arbitrary pattern, which bears some resemblance to the pattern shown in Figure 3. In using this type of diagonal I propose to only use them as tension diagonals so that the diagonal 9, as shown in Figures 3 and 4, would remain the same and retain the overlapping relationship with the U-strip as shown in Figure 4. When this form of tension diagonal is used they will be used in duplicate, as shown in Figure 14, and each flattened terminal will overlap a terminal of the adjacent compression diagonal.

Figure 15 is a cross-section through the tubular diagonal looking towards the split terminal and illustrates the fact that while the terminal 10' is split and flattened the upper and lower walls are left substantially straight so as to provide for an increased terminal efficiency. The particular cross-section of the tubular diagonal itself, as shown in Figure 15, has been found to be preferable because of its strength and efficiency. In the modification shown in Figure 3, both the compression and tension diagonals are formed in the manner shown in Figure 15, and even when tension diagonals of the type indicated in Figures 9 to 14 inclusive are used, the compression diagonals remain the same as shown in Figure 3 and have the particular cross-section shown in Figure 15. The walls 10ª of the tension diagonal tube 10 are carried through straight and are coplanar with the palmed end.

I have hereinbefore referred to the fact that the particular construction and arrangement of the truss members and the U-strip of the spar chord makes it a simple matter to produce the rivet pattern for the connection of the terminals of the diagonal truss members to each other and to the U-strip. A preferred method is illustrated in Figure 16, in which are shown the U-strip 1, the terminals 9' and 10' of the compression and tension diagonals, all placed together with rivet holes in alignment and with a series of rivets 11 extending therefrom ready to be squeezed. There is also shown in this figure a bar of metallic material 29 which may be inserted in the U-strip, so as to provide for a backing for the inward and opposed plunger action of the two opposed plungers 30 and 31 against the rivets. It will be seen that this plunger action will not in any manner destroy the contour of the U-strip, nor in any way damage the diagonal terminals or the U-strips. These plungers may be of the ordinary hydraulic or mechanical press type.

I claim:

1. A truss construction comprising a pair of U-shaped beams with cap strips riveted to and covering the open end thereof, a plurality of diagonal bracing elements extending between said beams and connected directly to each other and to said beams, each of said connections being adapted to be effected by a single rivet pattern, said beam and cap strip having the extremities of their contours curved.

2. An airplane wing spar comprising a pair of U-shaped beams with cap strips riveted to and covering the open end thereof, a plurality of diagonal bracing elements extending between said beams and connected directly to each other and to said beams, each of said connections being adapted to be effected by a single rivet pattern, said beam and cap strip having the extremities of their contours curved.

3. An airplane wing spar comprising a pair of U-shaped chord members having parallel sides, a plurality of tension and compression bracing elements extending therebetween and connected directly to each other and to said chord members at points excentric to the gravity axis of the spar chord.

4. An airplane wing spar comprising a pair of U-shaped chord members having parallel sides, a plurality of tension and compression bracing elements extending therebetween and connected directly to each other and to said chord members, each of said connections being adapted to be effected by a single group of rivets at points excentric to the gravity axis of the spar chord.

5. An airplane wing spar comprising a pair of U-shaped chord members having parallel sides, a plurality of tension and compression bracing elements extending therebetween and connected directly to each other and to said chord members, the terminals of said diagonals being arranged to overlap said chord members and said tension elements being arranged to overlap said compression elements, each of said connections being effected by a single group of rivets at points excentric to the gravity axis of the spar chord, each of said chord members being provided with a cap strip.

ROY G. MILLER.